(12) United States Patent  
Erickson

(10) Patent No.: US 8,143,850 B2
(45) Date of Patent: Mar. 27, 2012

(54) INDUCTIVE CHARGER BATTERY REPLACEMENT SYSTEM AND DEVICE

(75) Inventor: Craig Erickson, Stevenson Ranch, CA (US)

(73) Assignee: Teknocreations, Inc., Albuquerque, NM (US)

( * ) Notice: Subject to any disclaimer, the term of this patent is extended or adjusted under 35 U.S.C. 154(b) by 897 days.

(21) Appl. No.: 12/148,266

(22) Filed: Apr. 16, 2008

(65) Prior Publication Data

US 2009/0072784 A1    Mar. 19, 2009

Related U.S. Application Data

(60) Provisional application No. 60/994,263, filed on Sep. 17, 2007.

(51) Int. Cl.
*H01M 10/46* (2006.01)
(52) U.S. Cl. .................................................. 320/115
(58) Field of Classification Search .................. 320/107, 320/108, 112, 114, 115, 116
See application file for complete search history.

(56) References Cited

U.S. PATENT DOCUMENTS

| 5,601,942 | A | 2/1997 | Fedele |
| 6,700,351 | B2 * | 3/2004 | Blair et al. ............... 320/125 |
| 6,867,704 | B2 | 3/2005 | Pellegrino |
| 7,274,168 | B2 * | 9/2007 | Tskukamoto et al. ....... 320/106 |

OTHER PUBLICATIONS

Block, G, "Nyko Wii Charge Station Review," Feb. 13, 2007 [retrieved from internet Apr. 1, 2009]; Retrieved from internet from site: <URL: http:/gear.ign.com/articles/764/764273p1.html>, paras. 1-3, pictures 1-3.
PCT International Search Report (from PCT/US2008/10807, which is the corresponding PCT application from this currently pending US application), Dec. 2, 2008.
PCT Written Opinion (from PCT/US2008/10807, which is the corresponding PCT application from this currently pending US application), Nov. 6, 2008.

* cited by examiner

*Primary Examiner* — Edward Tso
(74) *Attorney, Agent, or Firm* — Richard B. Cates

(57) ABSTRACT

The invention is a device and system for providing power to a portable electronic device. A battery unit includes a rechargeable battery and is configured to be removably secured to a portable electronic device to provide power thereto. A base unit is configured to receive and charge one or more battery units, either alone or with the battery units secured to portable electronic devices. The battery unit includes a battery charge indicator, which can be a visible signal. An optical bath is defined through the base unit to transmit the visible signal of the battery unit to a base unit battery charge display.

20 Claims, 7 Drawing Sheets

INDUCTIVE CHARGER BATTERY REPLACEMENT SYSTEM AND DEVICE

RELATED PATENT APPLICATIONS

The present application claims priority under 35 U.S.C. Section 119(e) from Provisional Patent Application No. 60/994,263, filed Sep. 17, 2007 and entitled "Inductive Charger Battery Replacement System, Device & Method," the disclosure of which is incorporated by reference herein in its entirety.

FIELD OF THE INVENTION

The present invention relates to a system and method for charging battery-operated remote controls, including the replacement of standard batteries in handheld electronic game controller devices, and also the replacement of rechargeable batteries that have charging contact points for electronic devices. The invention has particular application to recharging hand-held remote devices, such as the Sony PS3™ wireless handheld controllers, Wii™ handheld remote, and the XBox 360™ wireless handheld controllers.

BACKGROUND

Hand-held and other portable electronic devices have become increasingly widespread and are used daily by many consumers. Examples of such devices include wireless hand-held game controllers, cell phones, MP3 players, and many other electronic devices.

Portable devices often rely on battery power while operating. The batteries are either disposable or rechargeable. Disposable batteries require replacement when their power is depleted, which is inconvenient and may require the user to maintain a supply of replacement batteries. Rechargeable batteries require periodic recharging, typically using an alternating current (AC) connected wall plug and charging stand with charging contact points. Many portable devices (and hand-held devices in particular) are exposed to materials (such as dirt, sweat, grease, etc.) which can cover the charging contact points, thereby interfering with the conductivity of the charging points and reducing (or in some cases entirely eliminating) the ability of the charging stand to recharge the batteries.

There is a need for a recharging system and method that permits portable devices to be easily recharged without the need for replacement batteries or charging contacts. The current invention meets this need.

SUMMARY

The current invention provides for charging of portable battery-operated devices (including those which normally use disposable batteries or which use rechargeable batteries and an AC adaptor charger) using an inductive recharging base without external charging contact points.

The invention comprises a battery unit configured to be installed onto the portable electronic device in place of the portable device's standard battery pack. The battery unit has rechargeable batteries and an inductive interface for the recharging of the rechargeable batteries. In one embodiment, the battery unit includes a rechargeable battery (such as a Lithium Ion polymer battery), a battery coupling inductor, a rectifier regulator, and charger protection (to prevent overcharging of the battery).

The invention further comprises a recharging base unit upon which the modified portable device can be placed to recharge the battery replacement unit. The recharging base unit receives power from a power source (such as an AC wall outlet), and comprises a base unit coupling inductor configured to interact with the battery coupling inductor in order to charge the battery in the battery replacement unit. In one embodiment, the recharging base unit comprises an AC adaptor (which can be connected to an AC wall outlet or other power source), a rectifier, an oscillation circuit, and a base unit coupling inductor. When the portable device is placed onto the base unit, the base unit coupling inductor (which is driven by power via the oscillation circuit) interacts with the battery coupling inductor, thereby recharging the replacement battery unit.

The invention thus enables the elimination of disposable batteries or, in the case of traditional rechargeable battery packs, of the exposed charging contacts which can easily become dirty and not function properly when exposed to sweating and dirty hands, etc.

The base unit of the invention includes an AC power adapter, one end of which fits into the AC wall plug and the other end of which leads into the base unit to supply power to the portable device via electromagnetic induction. (Note that other external power sources could also be used in accordance with the invention.) The base unit includes a reception port configured to receive at least a portion of the portable device. The reception port includes a primary coupling inductor.

The battery unit that replaces the batteries within the portable device will be custom designed to fit within a designated battery area and will consist of a cover, an inductive loop, a rectifying and charging circuit, and the rechargeable batteries that will power the device.

The recharging base unit upon which the battery replacement unit can be placed to receive its power contains an inductive loop and oscillating circuitry, which can itself be powered by a wall mount AC power adaptor. The adapter draws power from the AC outlet and supplies that power to the base to enable one or more inductive battery replacement units to recharge.

In another exemplary embodiment of the present invention, a battery replacement unit is designed specifically for one or more specific portable electronic devices. This is accompanied by a matching charging base unit.

The system is configured to permit a user to easily place one or more portable devices onto the base unit for re-charging, with the portable devices positioned on the base unit in an angled position to be easily viewed and removed. The system also includes a charge display permitting the user to easily determine the charge status of the battery unit without having to remove the battery unit and/or portable device from the base unit.

In one embodiment of the invention, a system for providing power to at least one portable electronic device has a first battery unit and a base unit. The battery unit has an upper side configured for attachment to a first portable electronic device, and a lower side. The battery unit also has a rechargeable battery configured for charging via a battery coupling inductor positioned on or adjacent the lower side. A battery charge indicator, such as a visible light, is positioned on the lower side (which is generally unseen when the battery unit is positioned on the base unit).

The system may also have a base unit with a first recess configured to receive the battery unit lower side while the battery unit is secured to a portable electronic device, and a first coupling inductor positioned at or adjacent an inner region of the first recess. When the battery unit is placed in the first recess the battery coupling inductor is inductively coupled with the first base unit coupling inductor. The base unit may also have a base unit battery charge display that provides an indication of the charge level of the battery unit. The battery charge indicator may be a visible signal, and the base unit may include a light path configured to define an optical path between the battery charge indicator and the base unit first battery charge display when the first battery unit is placed in the first recess. The light path may be or more reflectors, and/or a light tube. For example, a light tube port may be positioned within the first recess, and a first light tube can define an optical path from the light tube port to the base unit first battery charge display.

The system may be configured to charge multiple battery units. For example, the system may include a second battery unit similar to the first battery unit, with a second recess configured to receive the second battery unit lower side while the second battery unit is secured to the second portable electronic device. The base unit can also have a second coupling inductor positioned at or adjacent an inner region of the second recess, wherein when the second battery unit is placed in the second recess the second battery coupling inductor is inductively coupled with the second coupling inductor. A base unit second battery charge display can also be provided, with a second light path configured to define an optical path between the base unit second battery charge display and the second battery unit charge indicator when the second battery unit is placed in the second recess. The system may include third, fourth, etc. rechargeable battery units, with multiple recesses having multiple coupling inductors in the base unit. The first recess and the second recess may be positioned in a front-to-back or side-to-side configuration with respect to the base unit.

A system according to the invention for providing power to a portable electronic device may include one or more battery units, with each unit having a first exterior surface portion configured for removable attachment to a portable electronic device, a second exterior surface portion, a battery, a battery coupling inductor positioned adjacent the second exterior surface portion, and a battery charge indicator. The battery charge indicator can be positioned on the second exterior surface portion and be configured to provide a battery charge indicator signal. The system can also include a base unit having a battery coupling surface, such as a recess, configured to receive the second exterior surface portion of the battery unit. The base unit can also include a base unit power input, such as an incoming AC line, as well as a base coupling inductor positioned at or adjacent the battery coupling surface and configured to receive power from the base unit power input. When a battery unit is placed on the battery coupling surface, the base coupling inductor is inductively coupled with the battery coupling inductor. The base unit can also include a battery charge signal receiver configured to receive the battery charge signal, and a battery base unit charge display configured to provide a first battery base unit charge signal corresponding to the first battery charge signal. The battery charge signal receiver can be a first end of a light tube, and the first battery base unit charge display can be a second end of the light tube. The first battery charge signal may be a visible signal, and the first battery base unit charge display may be positioned on a front portion of the base unit. The battery charge signal receiver may be a first mirror, and the battery base unit charge display may be a second mirror. In another embodiment, a single mirror serves as both the battery charge signal receiver and the battery base unit charge display.

A base unit according to an embodiment of the invention may have a first recess configured to receive a battery unit, a first coupling inductor in or adjacent the first recess, a first light port in the first recess, a first visible charge display, and a first light tube defining an optical path from the first light port to the first visible charge display. In a further embodiment, a base unit is configured to charge multiple battery units, and includes multiple recesses configured to receive battery units. Each recess may be configured to receive a battery unit, and may have: a coupling inductor in or adjacent the recess; a light port in the recess; a charge display, such as a light or other visible charge display; and a light tube leading from the light port to the charge display.

In one embodiment, there are first and second recess configured to receive first and second battery units. The first recess and second recess may be positioned in side-to-side configuration with respect to the base unit, and the first visible charge display and the second visible charge display also positioned in side-to-side configuration with respect to the base unit. The first recess and second recess may be positioned in front-to-back configuration with respect to the base unit, and the first visible charge display and the second visible charge display also positioned in front-to-back configuration with respect to the base unit.

A method of the invention includes providing at least one replacement battery unit configured to be inductively charged and to replace a previously-provided (or stock) battery pack on a portable device; and providing a base unit configured to inductively charge the replacement battery unit. The replacement battery unit may be configured for application to a specific portable device. Instructions (written or otherwise) for replacing the stock battery unit with the replacement battery unit may also be provided. The method can also include removing the stock battery pack and replacing it with the replacement battery unit, and placing the replacement battery unit (with or without the portable device attached thereto) onto the base unit for charging.

DETAILED DESCRIPTION OF PREFERRED EMBODIMENTS

Figure 1A:
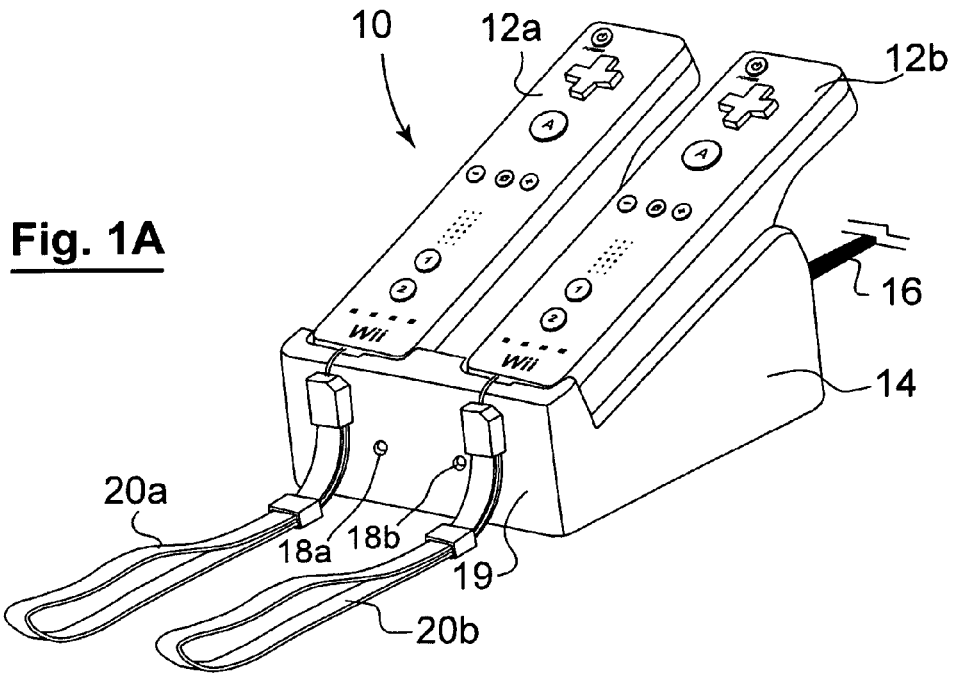
FIGS. 1A and 1B depict perspective and side views, respectively, of a system according to an embodiment of the invention.
Figure 1B:
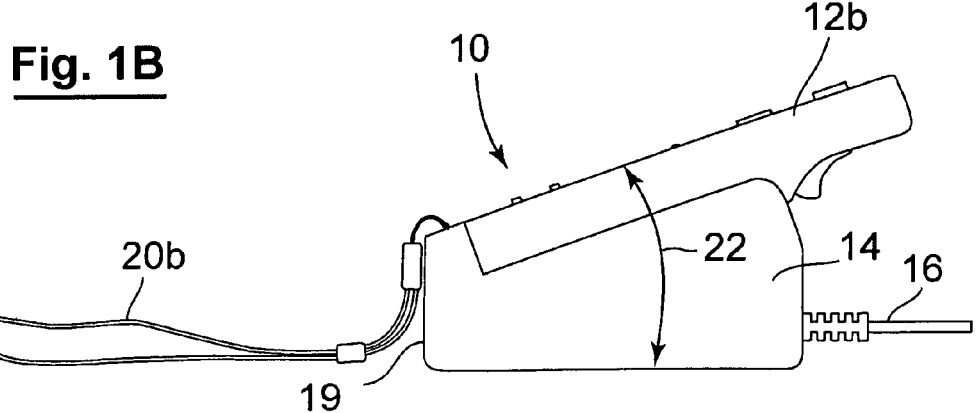

FIGS. 1A and 1B depict a system 10 according to the invention, comprising portable devices 12a, 12b positioned on a base unit 14. In the particular embodiment depicted, there are two (2) portable devices 12a, 12b which are both game controllers having a generally elongated shape, such as used with the Wii™ device.

The base unit 14 is connected to an external power source (such as an AC wall outlet) via a power cord 16. The base unit 14 includes base unit battery charge displays 18a, 18b which indicate the power charge of the corresponding portable devices 12a, 12b respectively. In the particular embodiment depicted, the base unit battery charge displays 18a, 18b are positioned on the front 19 of the base unit 14, which enables the base unit battery charge displays 18a, 18b to be easily viewed by a user without being obstructed by any portion of the portable devices 12a, 12b. To better accommodate portable devices 12a, 12b having holding straps 20a, 20b or other attachments which hang down and obstruct portions of the base unit 14, the charge displays 18a, 18b are offset from the areas directly underneath the holding straps 20a, 20b in order to prevent the base unit battery charge displays 18a, 18b being obstructed by the holding straps 20a, 20b.

The base unit 14 is configured to cradle and hold the portable devices 12a, 12b in an angled position for better accessibility and viewing. In the particular embodiment of FIG. 1B, the base unit 14 is seen to hold portable device 12b at an angle 22 of about 20 degrees from the horizontal plane. Many other angles are also within the scope of the invention. For example, angles in the range of 15 to 60 degrees can provide good visibility and accessibility, with angles from 15 to 35 degrees being particularly suitable for many portable devices.

Figure 2:
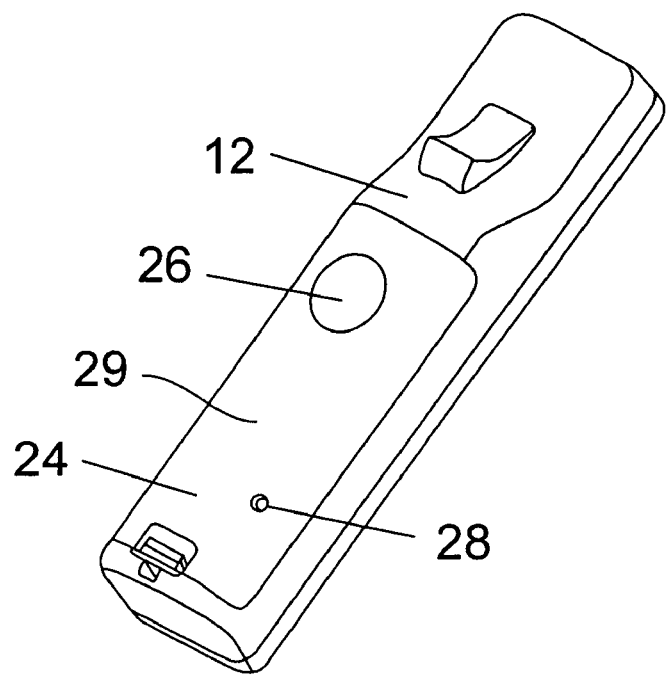
FIG. 2 depicts a portable device with battery unit according to an embodiment of the invention.
Figure 3:
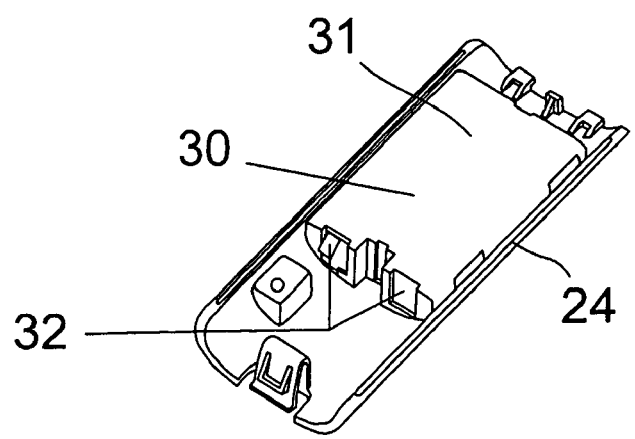
FIG. 3 depicts a battery unit according to an embodiment of the invention.

FIG. 2 depicts a portable device 12 from the lower (bottom) side. The battery unit 24 is removably secured to and provides power to the portable device 12. The lower side 29 of the battery unit 24 forms a lower exterior surface portion that is visible in the view of FIG. 2, while FIG. 3 shows the upper side 31 of the battery unit 24. The battery unit 24 includes a battery coupling inductor 26 and a battery charge indicator 28. The battery charge indicator 28, which may take the form of a light, indicates when the battery 30 is at a full charge. In the particular embodiment depicted, the battery charge indicator 28 is positioned on the lower side 29 of the battery unit 24. The battery charge indicator 28 can indicate the battery 30 is fully charged via various methods, including a solid light, flashing light, colored light, and/or combinations and/or variations in the color and/or rate of flashing of the light. In one particular embodiment, a solid light indicates charging and a flashing light indicates the charge is completed.

FIG. 3 depicts the battery unit 24, separately from the portable device 12 from FIG. 2, with the battery unit 24 viewed from the upper side 31 that is hidden within the portable device 12 when the battery unit 24 is secured thereto. The upper side 31 forms an upper exterior surface portion configured to be removably secured to a lower side of the portable device 12. The particular battery unit 24 depicted includes a rechargeable battery 30 configured to provided power to the portable device 12 (when attached thereto) via battery contacts 32. The battery unit 24 includes the battery inductive loop interface, rectifier/regulating circuitry, charging and battery (Li-ion) protective circuitry, and batteries all as one unit with a custom cover configured for attachment to a portable device in lieu of a standard battery pack.

The battery 30 can be of various rechargeable types, such as a Li-Ion Polymer battery. The battery unit is designed so that the existing internal battery contacts will be supplied with DC power, as if the original batteries were still installed.

Figure 4A:
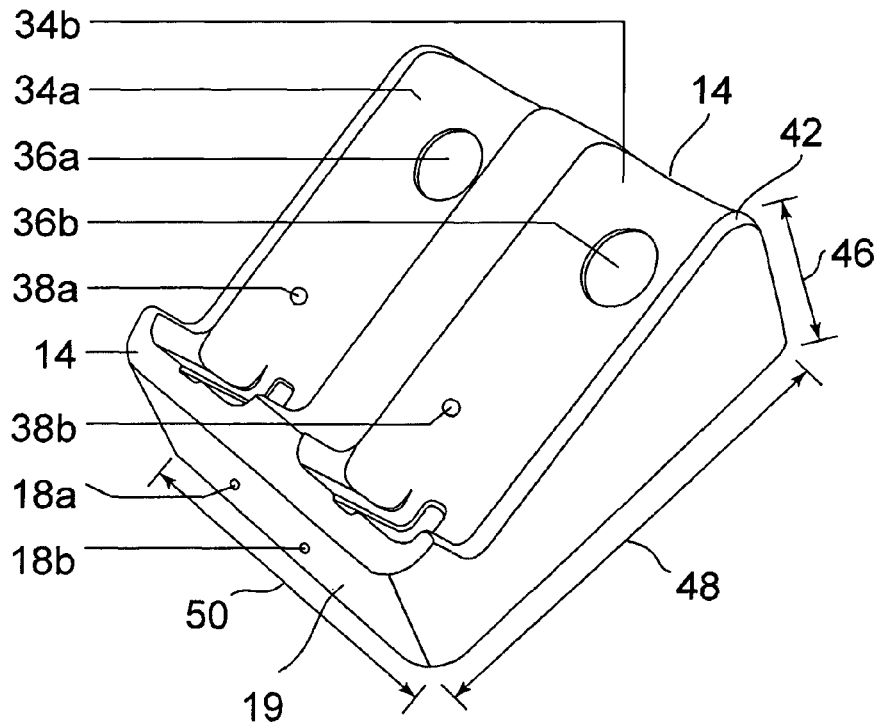
FIGS. 4A and 4B depict perspective views (top and bottom, respectively) of a base unit according to an embodiment of the invention.
Figure 4B:
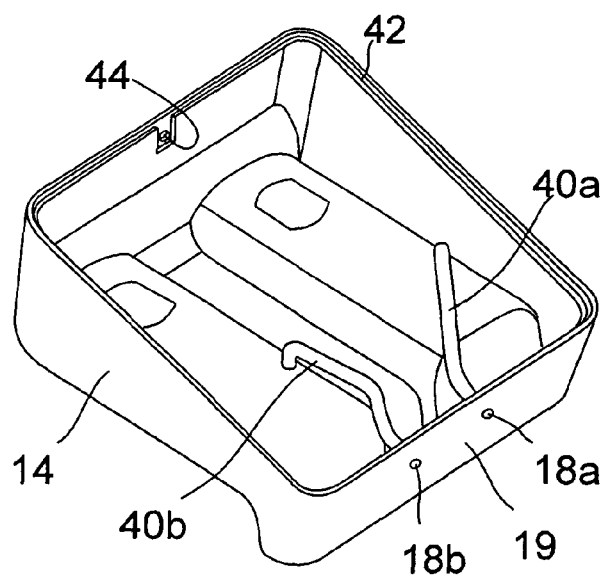

FIGS. 4A and 4B depict the base unit 14. The base unit 14 includes two recesses 34a, 34b which are each configured to receive battery units secured to portable devices (such as the battery units 24 and portable devices 12a, 12b depicted in FIGS. 1A, 1B, 2, 3). In the particular embodiment depicted, the recesses 34a, 34b are configured to receive the lower side of a battery unit secured to a portable electronic device, such as that depicted in FIGS. 2 and 3. The recesses 34a, 34b may receive and retain the battery units and portable devices via gravity alone, i.e., without the use of any clip, lock, or similar device to physically lock the portable device in place. In other embodiments, however, the invention could include locks, clips, sliders, etc. to provide improved retention of the portable devices onto the base unit 14.

The base unit 14 includes base coupling inductors 36a, 36b, which are configured to align and inductively couple with the battery coupling inductors (26 in FIG. 2) of a battery pack when a portable device is positioned on the base unit 14. In the particular embodiment depicted, the base coupling inductors are positioned in the recesses 34a, 34b under the base unit shell 42.

The base unit 14 includes battery charge signal receivers in the form of light tube ports 38a, 38b, which open to light tubes 40a, 40b leading to base unit battery charge displays 18a, 18b. The light tube ports 38a, 38b are positioned in the recesses 34a, 34b so that the battery charge indicators (e.g., element 28 on the battery unit 24 in FIG. 2) of the respective portable devices will align with the light tube ports 38a, 38b when the portable devices are positioned on the base unit 14. The light tubes 40a, 40b each form an optical path between the battery charge indicator of a battery unit (e.g., element 28 on the battery unit 24 of FIG. 2) and the base unit charge displays 18a, 18b. Accordingly, a visual indication (e.g., a colored and/or flashing light) provided by the battery charge indicator (e.g., element 28 on the battery unit 24 of FIG. 2) will be transmitted through a light tube port (38a or 38b) into a light tube (40a or 40b) and then out of the base unit battery charge displays (18a or 18b).

Note that other devices and methods for transmitting a battery charge signal from the battery charge indicator to the base unit battery charge display are also within the scope of the invention. For example, one or more optically-aligned mirrors could define an optical path from the battery charge indicator to the base unit battery charge display.

In the depiction of FIG. 4B, the internal electronics of the base unit 14 have been removed to better depict the shell 42 of base unit 14, the light tubes 40a, 40b, etc. The shell 42 supports the controllers and keeps the respective inductive areas (i.e., base coupling inductor and battery coupling inductor) well aligned to each other. Within the shell 42 itself will be the rectifier circuitry, the oscillation circuitry, and the primary inductive loop interface (not depicted in FIG. 4B). The base unit 14 also includes a power port opening 44 through which power is provided to the base unit 14 via an external power cord (element 16 in FIGS. 1A, 1B), which may provide power via an AC adaptor connected to an AC wall outlet.

The base unit 14 can have various dimensions, depending on the particular application (including such aspects as the particular portable device or devices to be charged, etc.). In the particular embodiment of FIGS. 4A-4B, the base unit 14 has a height 46 of 62 mm, a length 48 of 119 mm, and a width of 103 mm.

In the particular embodiment of FIGS. 4A-4B, the recesses 34a, 34b are positioned in a side-to-side configuration with respect to the front 19 of the base unit 14. Two battery units with portable devices attached thereto will thus, when placed in the recesses 34a, 34b, be positioned in side-to-side configuration, as depicted in FIG. 1. Other configurations of the recesses are also within the scope of the invention, including a front-to-back configuration such as that depicted in FIGS. 6A-6C, 7A, 7B.

Figure 5:
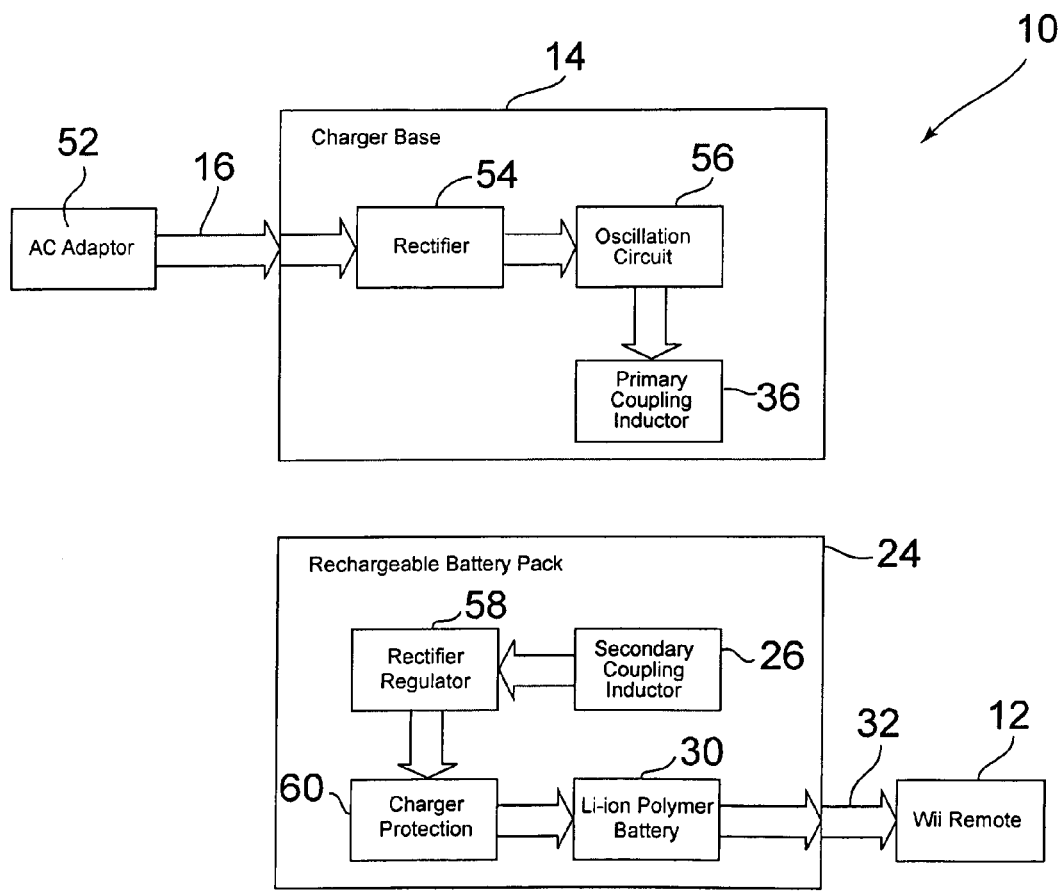
FIG. 5 is a block diagram of a system according to an embodiment of the invention.

FIG. 5 depicts a block diagram of aspects of a system 10 according to the invention. External power is provided via an AC adaptor 52, which provides power to the base unit 14 via, for example, a power line 16. The base unit 14 includes a rectifier 54 which powers an oscillation circuit 56 to drive the base coupling inductor 58.

With a portable device 24 positioned on the base unit 14, the base coupling inductor 36 drives the battery coupling inductor 26, which drives a rectifier regulator 58 to power (via a charger protection circuit 60) the rechargeable battery 30. The rechargeable battery 30 provides power to the portable device 12 via, for example, contacts 32.

Figure 6A:
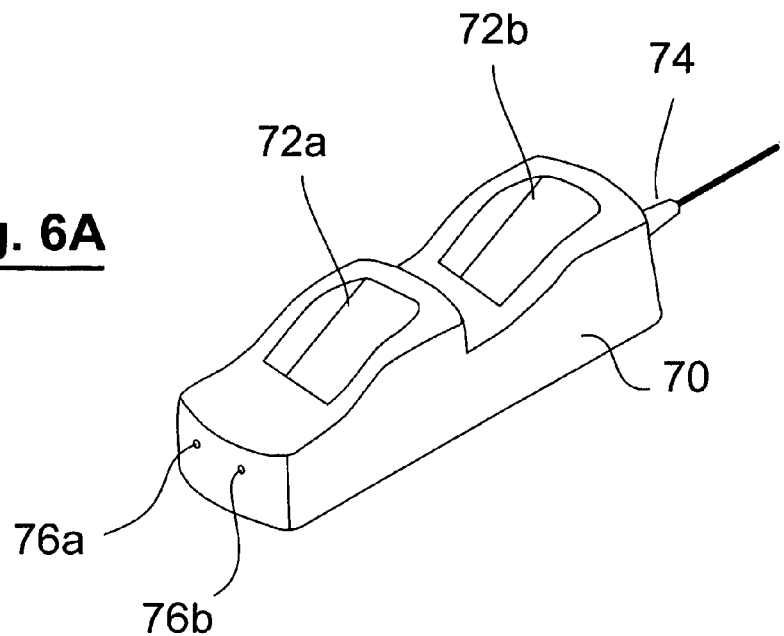
FIGS. 6A, 6B, and 6C depict perspective, side, and top views, respectively, of a base unit according to an embodiment of the invention.
Figure 6B:
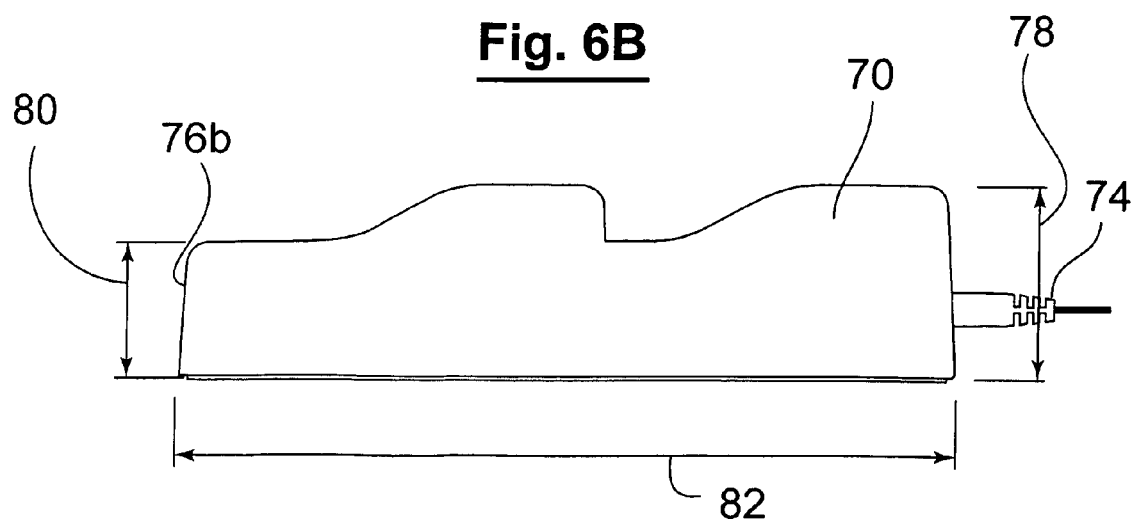
Figure 6C:
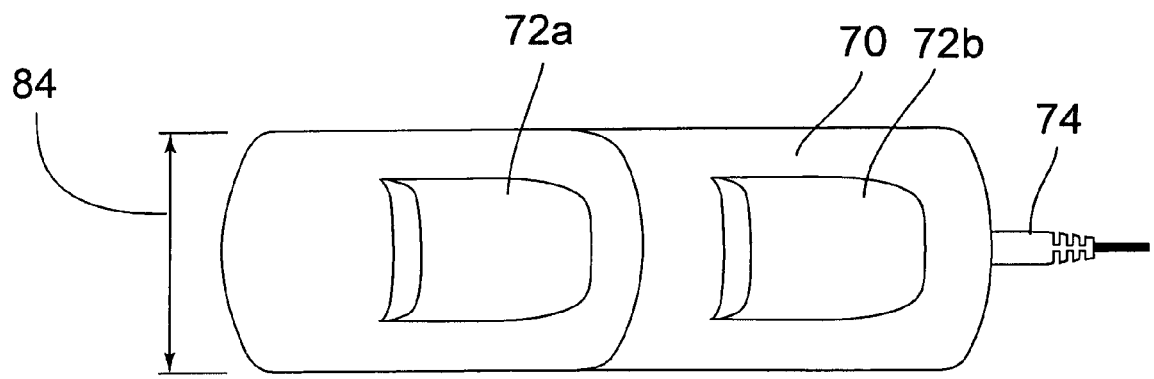

FIGS. 6A-6C depict various views of a base unit 70 according to a further embodiment of the invention. The base unit 70 includes two recesses 72, 72b, which are positioned one behind the other (as opposed to the side-by-side configuration of the base unit 14 of FIG. 1A). The base unit 70 can thus be used with portable devices having width or side extensions, etc. that make side-by-side positioning inconvenient and/or impractical. The base unit 70 receives power via a power cord 74, and includes charger displays 76a, 76b. The operation and internal workings of the base unit 70 of FIGS. 6A-6C are generally the same as the base unit 14 from FIGS. 1A, 4A, 4B, and 5.

The base unit 70 can have various dimensions, and in the particular embodiment depicted has a maximum height 78 of 50 mm, minimum height 80 of 35 mm, length 82 of 194 mm, and width 84 of 60 mm.

Figure 7A:
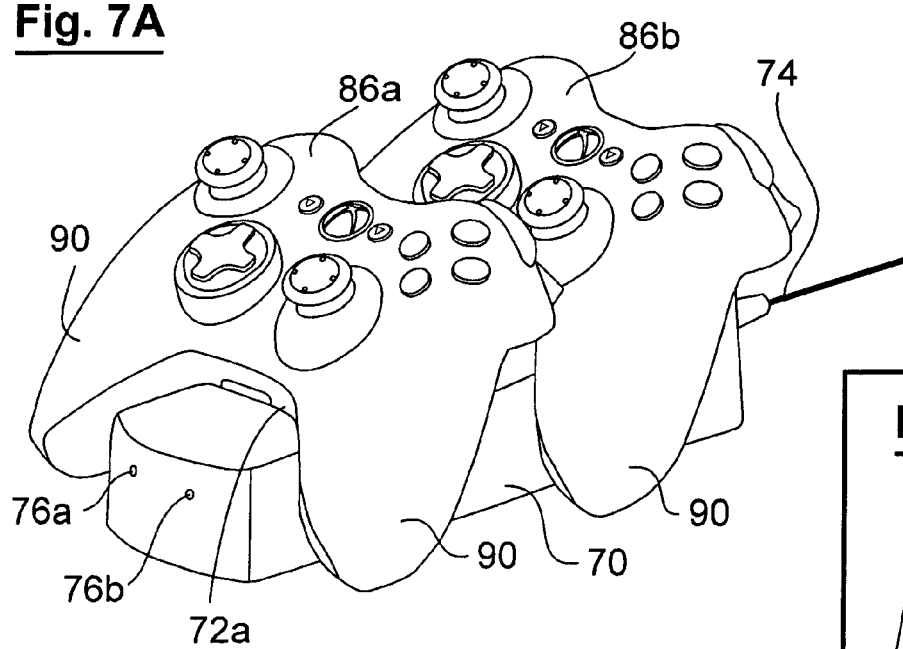
FIG. 7A depicts a perspective view of a base unit and portable devices according to an embodiment of the invention.
Figure 7B:
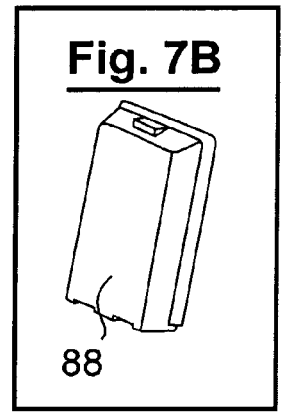
FIG. 7B depicts a perspective view of a battery unit according to an embodiment of the invention.

FIG. 7A depicts the base unit 70 of FIGS. 6A-6C, with portable devices 86a, 86b positioned thereon. The portable devices 86a, 86b each have a battery unit 88 (depicted in FIG. 7B). The battery unit 88 is operationally similar to the battery unit 24 from FIGS. 2, 3, and 5 (e.g., has a battery coupling inductor, etc.), but is shaped somewhat differently in order to be secured to the different portable devices 86, 86b of FIG. 7A.

The portable devices 86a, 86b are similar to those provided with the Xbox 360™. They are somewhat wide, and have wing-like extensions 90 on either side thereof. The base unit 70 is configured to receive the portable devices 86a, 86b, with the batteries (hidden from view in FIG. 7A, but seen as element 88 in FIG. 7B) of each portable device sitting in the respective recesses 72a, 72b, and with the wing-like extensions 90 passing on either side of the base unit 70.

Figure 7C:
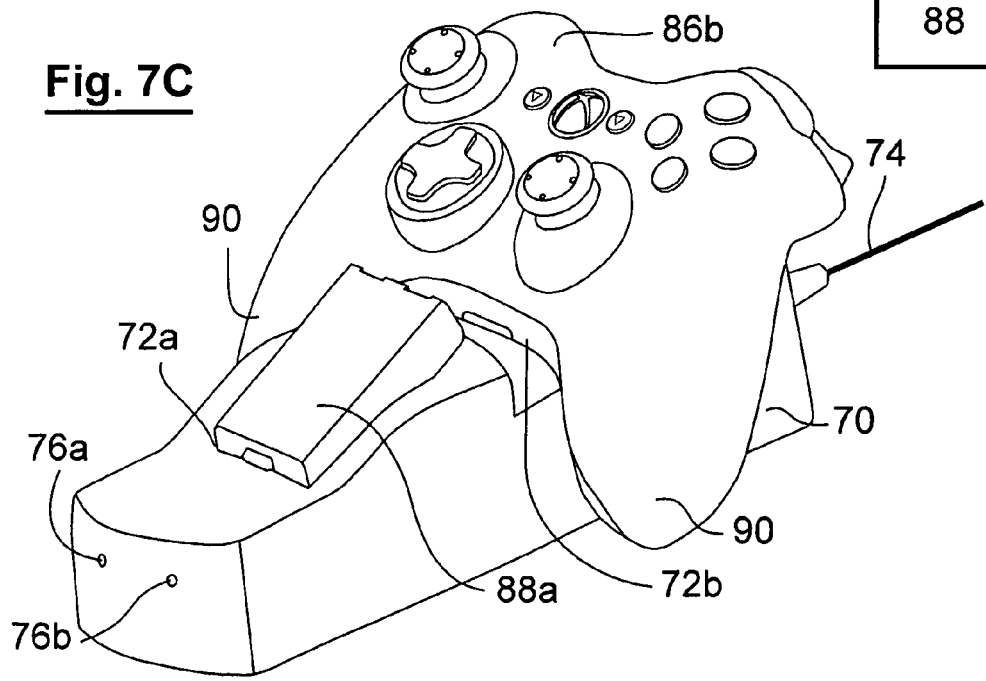
FIG. 7C depicts a perspective view of a base unit, portable device, and battery unit according to an embodiment of the invention.

FIG. 7C depicts one portable device 86b positioned on the base unit 70 in the second recess 72b, but only a rechargeable battery unit 88a positioned in the first recess 72a. In either case (i.e., whether the entire portable device (with battery unit) is positioned on the base unit, or just the battery unit alone), the battery unit will be recharged.

The invention has various methods of use. The battery unit may be provided along with the portable device when the portable device is initially sold to a potential user. Alternatively, the battery unit may be provided separately from the portable device. In such an embodiment, the user can remove the original battery pack (not shown) from the portable device, and install the battery unit in place of the original battery pack.

The user can recharge the battery unit by placing the portable device (with battery unit attached thereto) onto the base unit. Alternatively, the user could place the battery unit by itself (i.e., separated from the portable device) onto the base unit for recharging. For example, a user could have more than one battery unit for a particular portable device, so that the user can use the portable device with a first battery unit while a second battery unit is being charged/recharged on the base unit.

In the embodiments depicted, the base units have battery coupling surfaces in the form of recesses configured to receive the battery units/portable devices. However, other configurations for battery coupling surfaces to receive a battery unit are also within the scope of the invention. For example, instead of (or in addition to) a recess, a base unit may have a battery coupling surface in the form of one or more protrusions configured to engage with a battery unit.

It will be appreciated by those with ordinary skill in the art that the invention can be embodied in other specific forms without departing from the spirit or essential character thereof. The embodiments described above should be considered to be illustrative and not restrictive.

What is claimed is:

1. A system for providing power to at least one portable electronic device, comprising:
   a first battery unit comprising:
      a first battery unit upper side configured for attachment to a first portable electronic device;
      a first battery unit lower side;
      a rechargeable battery,
      a first battery coupling inductor positioned on or adjacent the first battery unit lower side; and
      a first battery charge indicator positioned on the first battery unit lower side;
   and
   a base unit comprising:
      a first recess configured to receive the first battery unit lower side while the first battery unit is secured to the first portable electronic device;
      a first coupling inductor positioned in or adjacent the first recess, wherein when the first battery unit is placed in the first recess the first battery coupling inductor is inductively coupled with the first coupling inductor;
      a base unit first battery charge display,
      a first light path configured to define an optical path between the base unit first battery charge display and the first battery unit charge indicator when the first battery unit is placed in the first recess.

2. The system of claim 1, wherein the first light path comprises a first reflector.

3. The system of claim 1, wherein the first light path comprises a first light tube.

4. The system of claim 3, wherein the base unit further comprises:
   a first light tube port positioned in the first recess and in optical alignment with the first battery unit charge indicator when the first battery unit is placed in the first recess;
   and wherein the first light tube defines an optical path between the first light tube port and the base unit first battery charge display.

5. The system of claim 1, further comprising:
   a second battery unit comprising:
      a second battery unit upper side configured for attachment to a second portable electronic device;
      a second battery unit lower side;
      a rechargeable battery,
      a second battery coupling inductor positioned on or adjacent the second battery unit lower side; and
      a second battery charge indicator positioned on the second battery unit lower side;
   wherein the base unit further comprises:

a second recess configured to receive the second battery unit lower side while the second battery unit is secured to the second portable electronic device;

a second coupling inductor positioned at or adjacent an inner region of the second recess, wherein when the second battery unit is placed in the second recess the second battery coupling inductor is inductively coupled with the second coupling inductor;

a base unit second battery charge display, a second light path configured to define an optical path between the base unit second battery charge display and the second battery unit charge indicator when the second battery unit is placed in the second recess.

6. The system of claim 5, wherein base unit has a front and a back, and the first recess and the second recess are positioned in a front-to-back configuration.

7. The system of claim 5, wherein base unit has a front and a back and opposing sides, and the first recess and the second recess are positioned in a side-to-side configuration.

8. The system of claim 1, further comprising:
a portable electronic device secured to the first battery unit.

9. The system of claim 8, wherein the base unit is configured to hold the first battery unit and portable electronic device such that the portable electronic device is at an angle of about 15 to 35 degrees from the horizontal.

10. A system for providing power to a portable electronic device, comprising:
a first battery unit comprising:
   a first exterior surface portion, the first exterior surface portion configured for removable attachment to a first portable electronic device;
   a second exterior surface portion;
   a battery;
   a battery coupling inductor positioned adjacent the second exterior surface portion; and
   a first battery charge indicator, wherein the first battery charge indicator is positioned on the second exterior surface portion and is configured to provide a first battery charge indicator signal;
and
a base unit comprising:
   a first battery coupling surface configured to receive the second exterior surface portion of the first battery unit;
   a base unit power input;
   a first base coupling inductor, wherein the first base coupling inductor is configured to receive power from the base unit power input, and the first base coupling inductor is positioned adjacent the first battery coupling surface at a position whereby the first base coupling inductor is inductively coupled with the first battery coupling inductor when the first battery unit is positioned on the base unit with the second exterior surface portion of the first battery received by the first battery coupling surface,
   a first battery charge signal receiver configured to receive the first battery charge signal,
   a first battery base unit charge display configured to provide a first battery base unit charge signal corresponding to the first battery charge signal.

11. The system of claim 10, wherein the first battery coupling surface is a first recess.

12. The system of claim 10, wherein the first battery charge signal receiver is a first end of a light tube, and the first battery base unit charge display is a second end of the light tube.

13. The system of claim 12, wherein the first battery charge signal is a visible signal, and the first battery base unit charge display is positioned on a front portion of the base unit.

14. The system of claim 10, wherein the base unit comprises an optical path passing from the first recess to the first battery base unit charge display, and wherein the optical path comprises a mirror.

15. The system of claim 10, further comprising:
a second battery unit comprising:
   a first exterior surface portion, the first exterior surface portion configured for removable attachment to a second portable electronic device;
   a second exterior surface portion;
   a battery;
   a battery coupling inductor positioned adjacent the second exterior surface portion; and
   a second battery charge indicator, wherein the second battery charge indicator is positioned on the second exterior surface portion and is configured to provide a second battery charge indicator signal.

16. The system of claim 15, wherein the base unit further comprises:
a second battery coupling surface configured to receive the second exterior surface portion of the second battery unit;
a second base coupling inductor, wherein the second base coupling inductor is configured to receive power from the base unit power input, and the second base coupling inductor is positioned adjacent the second battery coupling surface at a position whereby the second base coupling inductor is inductively coupled with the second battery coupling inductor when the second battery unit is positioned on the base unit with the second exterior surface portion of the second battery received by the second battery coupling surface;
a second battery charge signal receiver configured to receive the second battery charge signal;
a second battery base unit charge display configured to provide a second battery base unit charge signal corresponding to the second battery charge signal.

17. A base unit for inductively charging one or more battery units, comprising:
a first recess configured to receive a battery unit;
a first coupling inductor in or adjacent the first recess;
a first light port in the first recess;
a first visible charge display; and
a first light tube defining an optical path from the first light port to the first visible charge display.

18. The base unit of claim 16, further comprising:
a second recess configured to receive a battery unit;
a second coupling inductor in or adjacent the first recess;
a second light port in the second recess;
a second visible charge display; and
a second light tube defining an optical path from the second light port to the second visible charge display.

19. The base unit of claim 18, wherein the first recess and second recess are positioned in side-to-side configuration with respect to the base unit, and the first visible charge display and the second visible charge display are positioned in side-to-side configuration with respect to the base unit.

20. The base unit of claim 18, wherein the first recess and second recess are positioned in front-to-back configuration with respect to the base unit, and the first visible charge display and the second visible charge display are positioned in front-to-back configuration with respect to the base unit.

* * * * *